US010168927B2

(12) United States Patent
Chen et al.

(10) Patent No.: US 10,168,927 B2
(45) Date of Patent: \*Jan. 1, 2019

(54) DATA MIRRORING FOR NETWORK ATTACHED STORAGE

(71) Applicant: INTERNATIONAL BUSINESS MACHINES CORPORATION, Armonk, NY (US)

(72) Inventors: Lior Chen, Jerusalem (IL); Dan Cohen, Nataf (IL); Daniel Gan-Levi, Modiin (IL); Nimrod Sapir, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,641

(22) Filed: Mar. 3, 2017

(65) Prior Publication Data

US 2017/0177251 A1 Jun. 22, 2017

Related U.S. Application Data

(63) Continuation of application No. 14/490,701, filed on Sep. 19, 2014, now Pat. No. 9,678,679.

(51) Int. Cl.
*G06F 17/30* (2006.01)
*G06F 3/06* (2006.01)
(Continued)

(52) U.S. Cl.
CPC ............ *G06F 3/0619* (2013.01); *G06F 3/065* (2013.01); *G06F 3/067* (2013.01); *G06F 3/0622* (2013.01);
(Continued)

(58) Field of Classification Search
CPC .... G06F 3/0619; G06F 3/0647; G06F 3/0622; G06F 3/067; G06F 17/30917;
(Continued)

(56) References Cited

U.S. PATENT DOCUMENTS 7,720,796 B2 5/2010 Wong et al.
8,700,575 B1 4/2014 Srinivasan et al.
(Continued)

OTHER PUBLICATIONS

IBM, Appendix P, List of IBM Patents or Patent Applications Treated As Related, dated Mar. 3, 2017, 2 pages.
(Continued)

*Primary Examiner* — Albert M Phillips, III
(74) *Attorney, Agent, or Firm* — John W. Hayes; William H. Hartwell

(57) ABSTRACT

A computer-implemented method for data mirroring for network attached storage includes duplicating an identity mapping database on a second NAS server and creating a queue of updated data files containing updated elements since a prior synchronization. Data files containing the updated elements are transmitted from the first NAS server to the second NAS server. An updated copy of the identity mapping database from the first NAS server is stored at the second NAS server. The updated data files and metadata information from the first NAS server are written to the second NAS server. The permission entries of the transmitted data files from the first NAS server are translated using the identity mapping databases of the first and second NAS servers, such that the permission entries reflect the local ID mapping database on the second NAS server.

15 Claims, 5 Drawing Sheets

(51) Int. Cl.
*G06F 11/14* (2006.01)
*G06F 21/62* (2013.01)
*H04L 29/06* (2006.01)

(52) U.S. Cl.
CPC ........ *G06F 3/0647* (2013.01); *G06F 11/1469* (2013.01); *G06F 17/30575* (2013.01); *G06F 17/30917* (2013.01); *G06F 21/6227* (2013.01); *H04L 63/101* (2013.01)

(58) Field of Classification Search
CPC ................ G06F 11/1469; G06F 3/065; G06F 17/30575; G06F 21/6227; H04L 63/101
See application file for complete search history.

(56) References Cited

U.S. PATENT DOCUMENTS

| | | |
|---|---|---|
| 2005/0044399 A1 | 2/2005 | Dorey |
| 2007/0055703 A1 | 3/2007 | Zimran et al. |
| 2008/0140669 A1 | 6/2008 | Corrion |
| 2016/0085461 A1 | 3/2016 | Chen et al. |

OTHER PUBLICATIONS

Condorman, "How to Replicate File Shares Using Microsoft RichCopy", Symantec Connect, Created: Sep. 17, 2009, retrieved on Oct. 24, 2016, 8 pages.

US 10,168,927 B2

DATA MIRRORING FOR NETWORK ATTACHED STORAGE

FIELD OF THE INVENTION

The present invention relates generally to the field of data mirroring, and more particularly to file-based data mirroring for network attached storage systems.

BACKGROUND OF THE INVENTION

In the computer industry, it is recognized that disks are inherently unreliable components of computer systems. Mirroring is a technique that enables a system to automatically maintain one or more copies of data so that in the event of a disk hardware failure, a system can continue to process or quickly recover data. Mirroring may be done locally, where it is specifically aimed at prospective disk unreliability, or it may be done remotely, where it forms part of a more sophisticated disaster recovery scheme. Data mirroring to a remote site at a physically distant location is often referred to as data replication. Mirroring may also be done both locally and remotely, as seen in high availability systems. Data mirroring is widely used in database management as well as network attached storage devices.

A network attached storage (NAS) device is a dedicated file server located in a local area network (LAN). Unlike a general purpose computer or workstation, network attached storage architecture consists of the bare-bones components necessary to support file transfers and scalable storage, such as hard disks or tape drives. Any data that appears in the form of files, such as text documents, web content, images, remote system backups, etc., can be stored in a NAS device. NAS devices require no keyboard, monitor, or mouse and usually run on an embedded or minimized operating system such as Portable operating system interface for UNIX (POSIX) rather than a full-featured operating system.

POSIX is a family of standards specified for maintaining compatibility between operating systems. Software programs designed to conform to POSIX standards can easily be ported to POSIX-compliant operating systems. In NAS devices using POSIX-based operating systems, internal identities are determined by ID mapping logic. This logic maps external identities such as Windows® security identifier (SID) or Unix-like user or group identifiers (UIDs/GIDs) to internal (UID/GID) identities. The exact mapping can be determined, for example, by system configuration or the order in which the external entities were mapped.

SUMMARY

Embodiments of the present invention disclose a method, computer program product, and system for data mirroring for network attached storage. A computer-implemented method includes duplicating an identity mapping database on a second NAS server and creating a queue of updated data files containing updated elements since a prior synchronization. Data files containing the updated elements are transmitted from the first NAS server to the second NAS server. An updated copy of the identity mapping database from the first NAS server is stored at the second NAS server. The updated data files and metadata information from the first NAS server are written to the second NAS server. The permission entries of the transmitted data files from the first NAS server are translated using the identity mapping databases of the first and second NAS servers, such that the permission entries reflect the local ID mapping database on the second NAS server.

DETAILED DESCRIPTION

A desired aspect of network attached storage (NAS) servers, both file-based and unified serving multiple environments, is to maintain security entries such as ACL and file ownership throughout a cluster or mirrored NAS computing environment. When trying to create a file-based mirroring relation between two pre-configured NAS servers, the identity mappings on both sides may not match. When a mirroring configuration is created between these NAS servers, the permission entries such as ACLs and file ownership represented by the distinct mapping entries on each side will be lost or become corrupted. One solution to this problem is to require one of the NAS servers to be unused before creating mirroring configurations, and to constantly synchronize the mappings on both sides after the mirroring configuration is created. This solution, however, imposes restriction on the initial system configuration, and may be complicated to maintain if both sides are actively managing the mapping at the same time.

Rather than trying to synchronize or pre-determine the identity mapping database on both NAS servers, the identity mapping is managed separately on each of the servers. During the mirroring process, each NAS server runs an on-the-fly conversion of the security entries, such as ACLs and file ownership of the remote files, using both local and remote identity maps.

Figure 1:
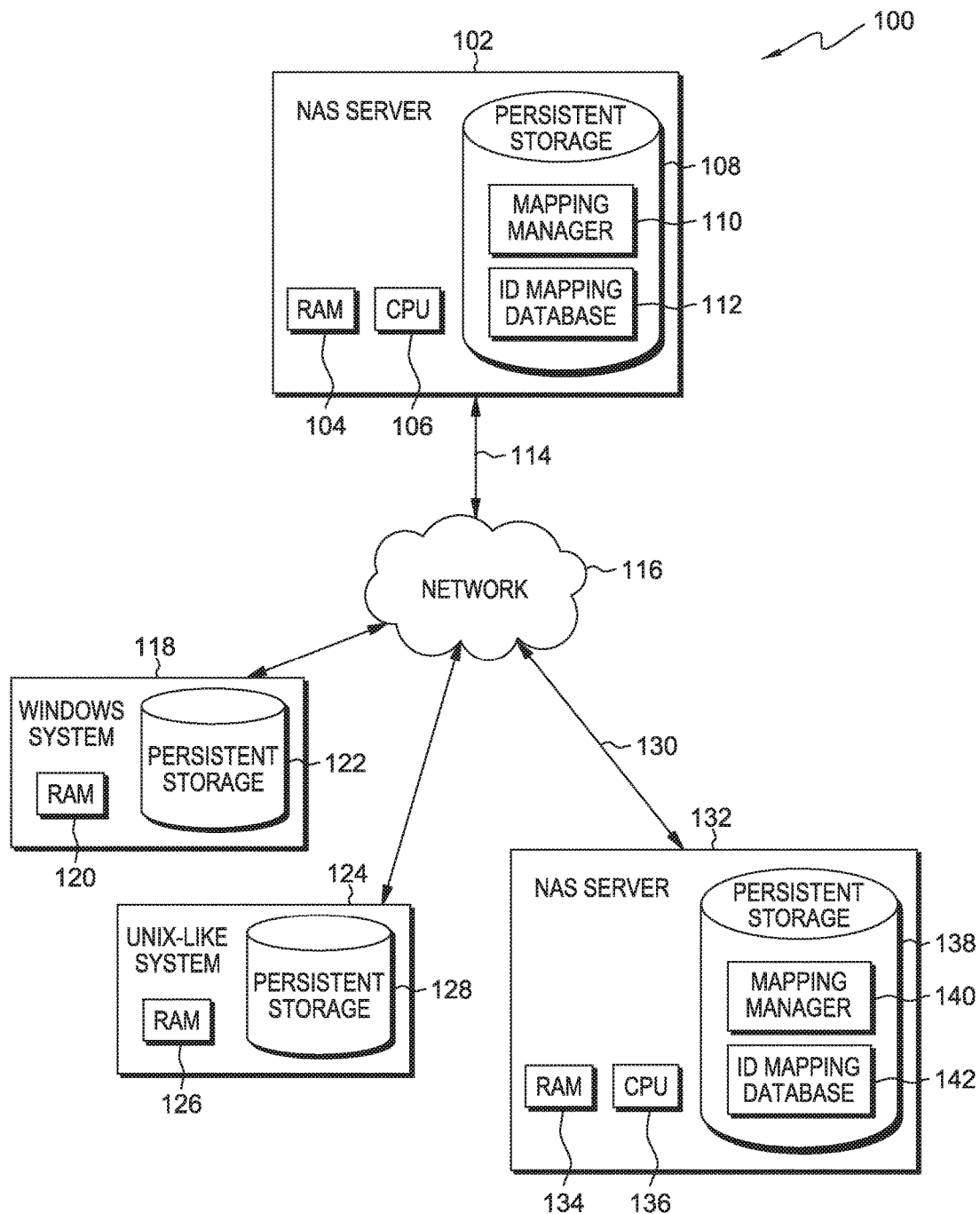
FIG. 1 is a functional block diagram illustrating a network attached storage environment, in an embodiment in accordance with the present invention.

Embodiments in accordance with the present invention will now be described in detail with reference to the Figures. FIG. 1 is a functional block diagram, generally depicted by the numeral 100, illustrating a network attached storage environment, in an embodiment in accordance with the present invention. FIG. 1 provides only an illustration of one embodiment and does not imply any limitations with regard to the environments in which different embodiments may be implemented. NAS server 102 includes RAM 104, a central processing unit 106, and persistent storage 108. Persistent storage 108 may, for example, be a hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer-readable storage medium that is capable of storing program instructions or digital information. Mapping manager 110 and ID mapping database 112 are stored in persistent storage 108, which also includes operating system software, as well as software that enables the NAS server 102 to communicate with users and update other NAS servers in the cluster over data connection 114 to network 116. There can be many more storage devices in this environment than are depicted in FIG. 1, and there can also be many more NAS servers in this environment than are depicted. They may be operating as standalone servers, or clustered together mirroring data.

Windows® system 118 and UNIX-like system 124 are client computers of NAS server 102 and NAS server 132 in NAS computing environment 100. Windows system 118 also has RAM 120 and persistent storage 122, such as a hard disk drive. UNIX-like system 124 also has RAM 126 and persistent storage 128, such as a hard disk drive. Persistent storage 122 and 128 may, for example, be a hard disk drive. Alternatively, or in addition to a magnetic hard disk drive, persistent storage 122 and 128 can include a solid state hard drive, a semiconductor storage device, read-only memory (ROM), erasable programmable read-only memory (EPROM), flash memory, or any other computer-readable storage medium that is capable of storing program instructions or digital information. Persistent storage 122 and 128 include operating system software, as well as software that enables Windows® system 118 and UNIX-like system 124 to communicate with users, NAS server 102, and NAS server 132 of NAS computing environment 100 over data connection 114 to network 116. Windows® system 118 and UNIX-like system 124 may be a Web server, or any other electronic device or computing system, capable of processing program instructions and receiving and sending data. In some embodiments, either or both Windows® system 118 and UNIX-like system 124 may be a laptop computer, a tablet computer, a netbook computer, a personal computer (PC), a desktop computer, a personal digital assistant (PDA), a smart phone, or any programmable electronic device capable of communicating over data connection 114 to network 116. In other embodiments, either or both Windows® system 118 and UNIX-like system 124 may represent server computing systems utilizing multiple computers as a server system, such as in a distributed computing environment. In general, Windows® system 118 and UNIX-like system 124 are representative of any electronic devices or combinations of electronic devices capable of executing machine-readable program instructions.

NAS server 132 includes RAM 134, a central processing unit 136, and persistent storage 138. Persistent storage 138 may, for example, be a hard disk drive. Alternatively, or in addition to a magnetic hard disk drive, persistent storage 138 can include a solid state hard drive, a semiconductor storage device, read-only memory (ROM), erasable programmable read-only memory (EPROM), flash memory, or any other computer-readable storage medium that is capable of storing program instructions or digital information. Mapping manager 140 and ID mapping database 142 is stored in persistent storage 138 which also includes operating system software as well as software that enables the NAS server 132 to communicate with users, and update other NAS servers in the cluster over data connection 130 to network 116.

Mapping manager 110 on NAS server 102 and mapping manager 140 on NAS server 132 are used to convert the security entries, such as access control lists (ACLs) and file ownership on mirrored files between NAS servers. An ACL list is a list of access control entries (ACE) that identifies a trusted user and specifies the access right granted for that user. ID mapping database 112 on NAS server 102 and ID mapping database 142 on NAS server 132 are used to store the ID mapping for the external and internal IDs and are kept consistent across the cluster of NAS computing environment 100. In one embodiment, mapping manager 110 on NAS server 102 and mapping manager 140 on NAS server 132 may be a single instance contained in a separate server computer located in NAS computing environment 100. In other embodiments, ID mapping database 112 on NAS server 102 and ID mapping database 142 on NAS server 132 may be a single instance contained in a separate server computer located in NAS computing environment 100.

Figure 2:
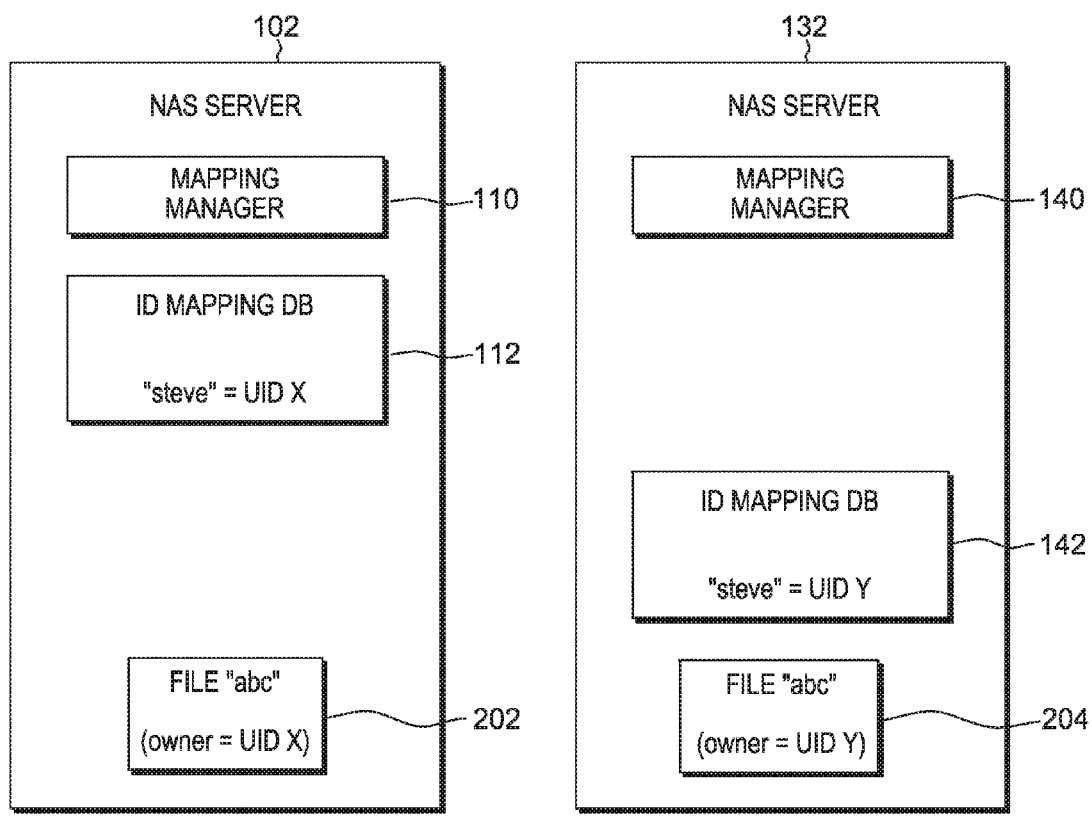
FIG. 2 is a functional block diagram illustrating the external user relationship with internal user identifiers and file ownership of two NAS servers, in an embodiment in accordance with the present invention.

FIG. 2 is a functional block diagram illustrating the external user relationship with internal user identifiers and file ownership of two NAS servers, in an embodiment in accordance with the present invention. NAS server 102 contains mapping manager 110, ID mapping database 112, and file "abc" 202. NAS server 132 contains mapping manager 140, ID mapping database 142, and file "abc" 204. There can be many more data files located on NAS server 102 and NAS server 132 than are depicted in FIG. 2. External user "steve" has an internal UID X on NAS server 102 and an internal UID Y on NAS server 132. File "abc" 202 is located on NAS server 102 and has its ACL and ownership set to UID X. File "abc" 204 is located on NAS server 132 and has its ACL and ownership set to UID Y.

Figure 3:
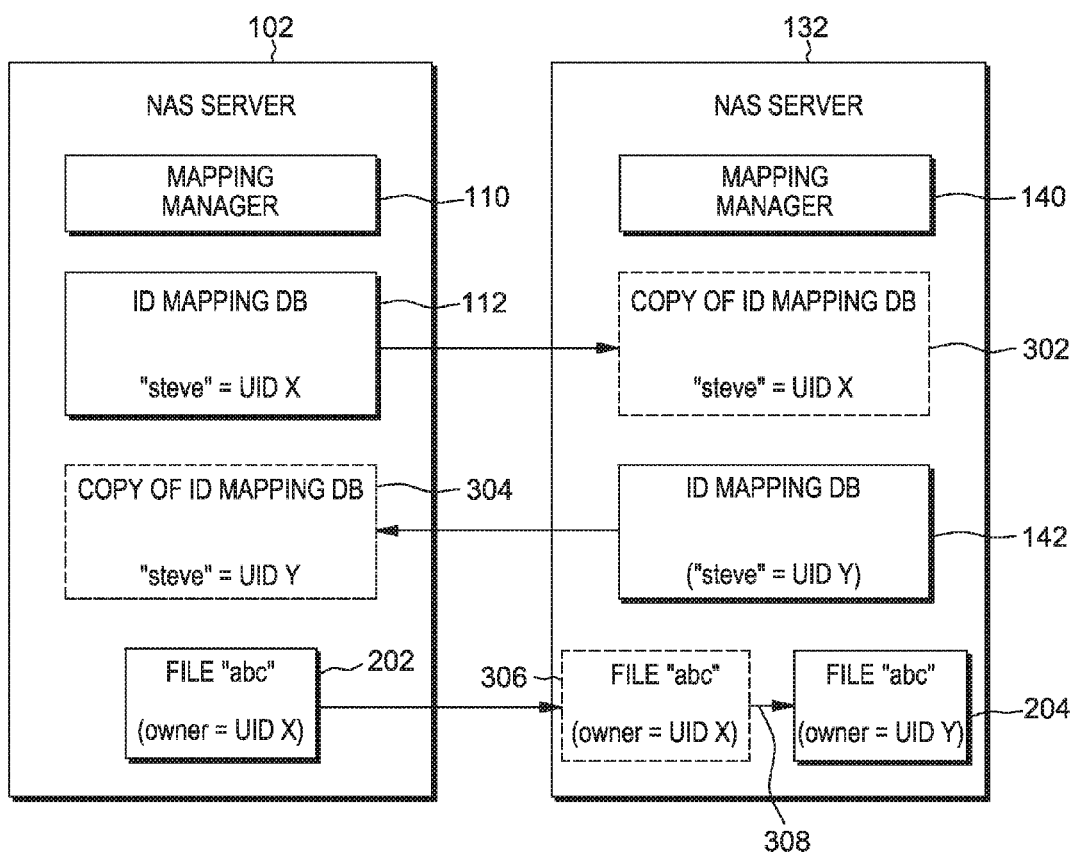
FIG. 3 is a functional block diagram illustrating the asynchronous data mirroring and the security entry conversions of mirrored files, in an embodiment in accordance with the present invention.

FIG. 3 is a functional block diagram illustrating the asynchronous data mirroring and the security entry conversions of mirrored files, in an embodiment in accordance with the present invention. An established file-based mirroring configuration exists between NAS server 102 and NAS server 132 over data connections 114 and 130 to network 116 of the NAS computing environment 100. NAS server 102 and NAS server 132 then transmit a copy of the local ID mapping database to the other system, illustrated in FIG. 3 by Copy of ID mapping DB 302 on NAS server 132 and Copy of ID mapping DB 304 on NAS server 102. Once the ID mapping databases are synchronized, NAS server 102 creates a queue of data files containing updated elements and/or changed metadata. ID mapping database 112 is placed at the top of the queue to ensure the internal UID can be restored once the file is mirrored to NAS server 132. Mapping manager 140 on NAS server 132 then converts the ACL and ownership entries of each file to match the internal UID Y of external user "steve" as depicted by mapping conversion indicator 308. Mapping manager 140 does this by using the Copy of ID mapping database 302 to map the internal user identity UID X, as it appears in the ACL entry, to the external user ID "steve", for file "abc" 306. Mapping manager 140 then uses its local ID mapping database 142 to map the external user ID UID Y, to the local internal user ID "steve" for file "abc" 306. When this is complete, the internal representation of the ACL for file "abc" 202 and 204 is different in both NAS server 102 and NAS server 132, however when NAS server 102 and NAS server 132 are accessed individually, the ACL entry for file "abc" will still be owned by external user ID "steve".

Figure 4:
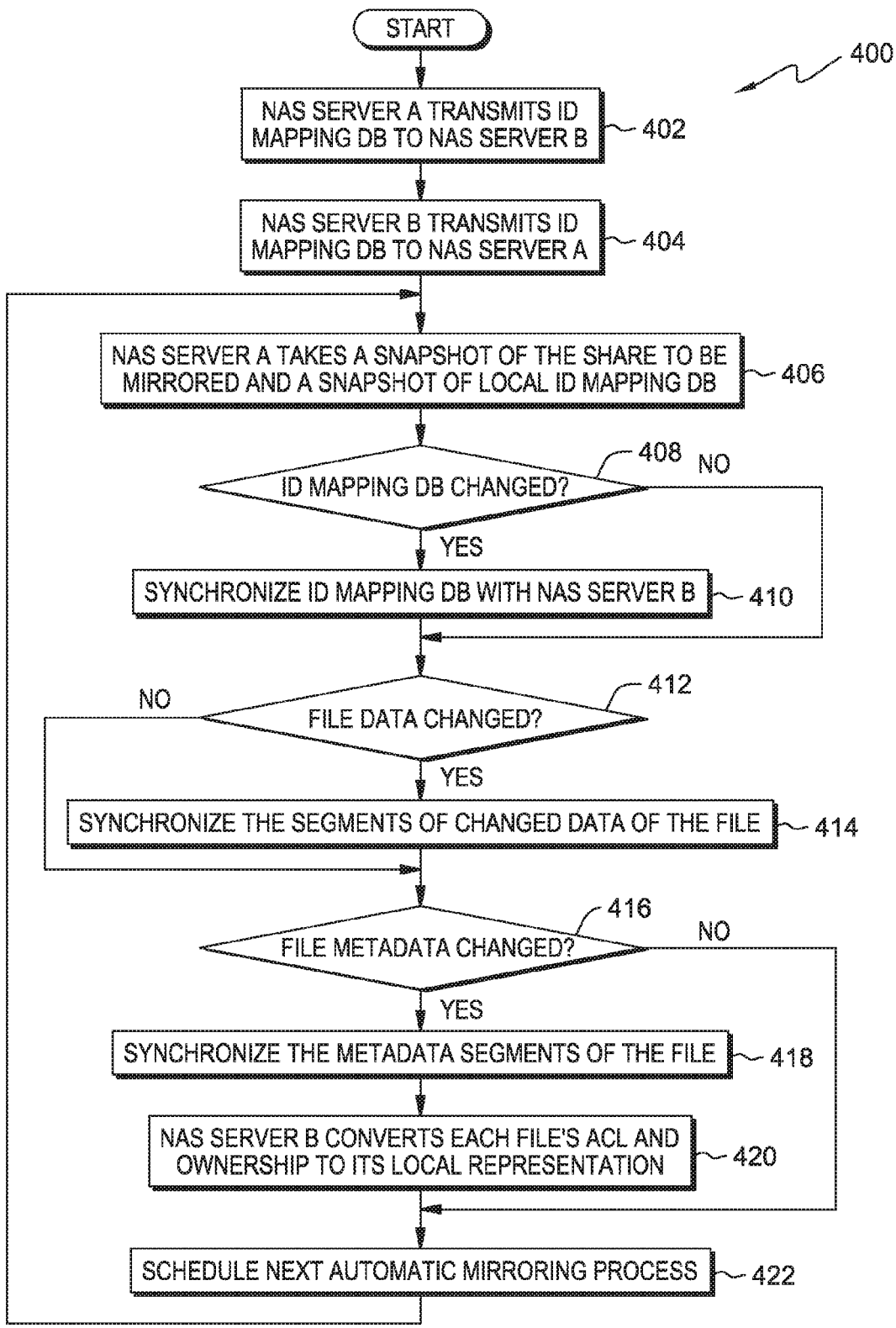
FIG. 4 is a flowchart illustrating operational steps of asynchronous mirroring and identity mapping in the NAS computing environment, in an embodiment in accordance with the present invention.

FIG. 4 is a flowchart, generally depicted by the numeral 400, illustrating operational steps of asynchronous mirroring and identity mapping in the NAS computing environment, in an embodiment in accordance with the present invention. In step 402, NAS server 102 transmits its local Copy of ID mapping database 112, which is stored by NAS server 132 separately from its own local ID mapping database. NAS server 132, in turn, transmits its local Copy of ID mapping database 302 to NAS server 102 to also hold as a separate database for the mirroring process as depicted in step 404. In step 406, NAS system 102 takes a snapshot of each of the data file shares, i.e., sets of data files in the queue, to be mirrored between NAS server 102 and NAS server 132 as well as a snapshot of its local ID mapping database 112 to ensure that the ACL translation is performed using the latest copies. In decision step 408, NAS server 102 determines if the ID mapping database 112 had been updated since the last snapshot. In computer systems, a snapshot is the state of the system at a particular point in time. If ID mapping database 112 has been updated since the last snapshot, ("yes" branch, step 408), NAS server 102 synchronizes ID mapping database 112 with NAS server 132 as depicted in step 410. If there has been no changes to ID mapping database 112, ("no" branch, step 408), ID mapping database 112 is not synchronized with NAS server 132 and step 410 is skipped. NAS server 132 checks to see if the file data "abc" has changed in decision step 412. If the files are different, ("yes" branch, step 412), NAS server 132 synchronizes the local copy of the data file "abc" with the transmitted data segments as depicted in step 414. If no changes are required, ("no" branch, step 412), nothing is done to the data segments of the local copy of data file "abc".

In decision step 416, NAS server 102 checks to see whether the metadata information such as ACL and ownership of the data file "abc" has changed. Metadata is defined as the data providing information about one or more aspects of data such as author, date created, date modified, file size, ACL entries and ownership. If there have been changes to the metadata ("yes" branch, decision 416), the metadata section of the data file "abc" is synchronized with NAS server 132 as depicted in step 418. If there have been no changes to the metadata ("no" branch, decision 416), no metadata sections are synchronized with NAS server 132 and step 418 is skipped. In step 420, NAS server 132 converts each transmitted data file's ACL and ownership to match the local representation for the external user using local ID mapping database 142 and remote copy of ID mapping database 302. This is accomplished by first mapping each UID back to the external user identity it represents using the copy of the remote ID mapping database 112 and then mapping the user identity to the local UID of the same external user identity using the local ID mapping database 142. This process is repeated periodically between NAS server 102 and NAS server 132. In step 422, an automatic mirroring process is scheduled to repeat steps 406 through 422. In one embodiment, this may be accomplished using software programmed timers. In another embodiment, it may be accomplished using one or more program threads. In other embodiments, the mirroring process may be bi-directional with shares being performed from NAS server 132 to NAS server 102.

Figure 5:
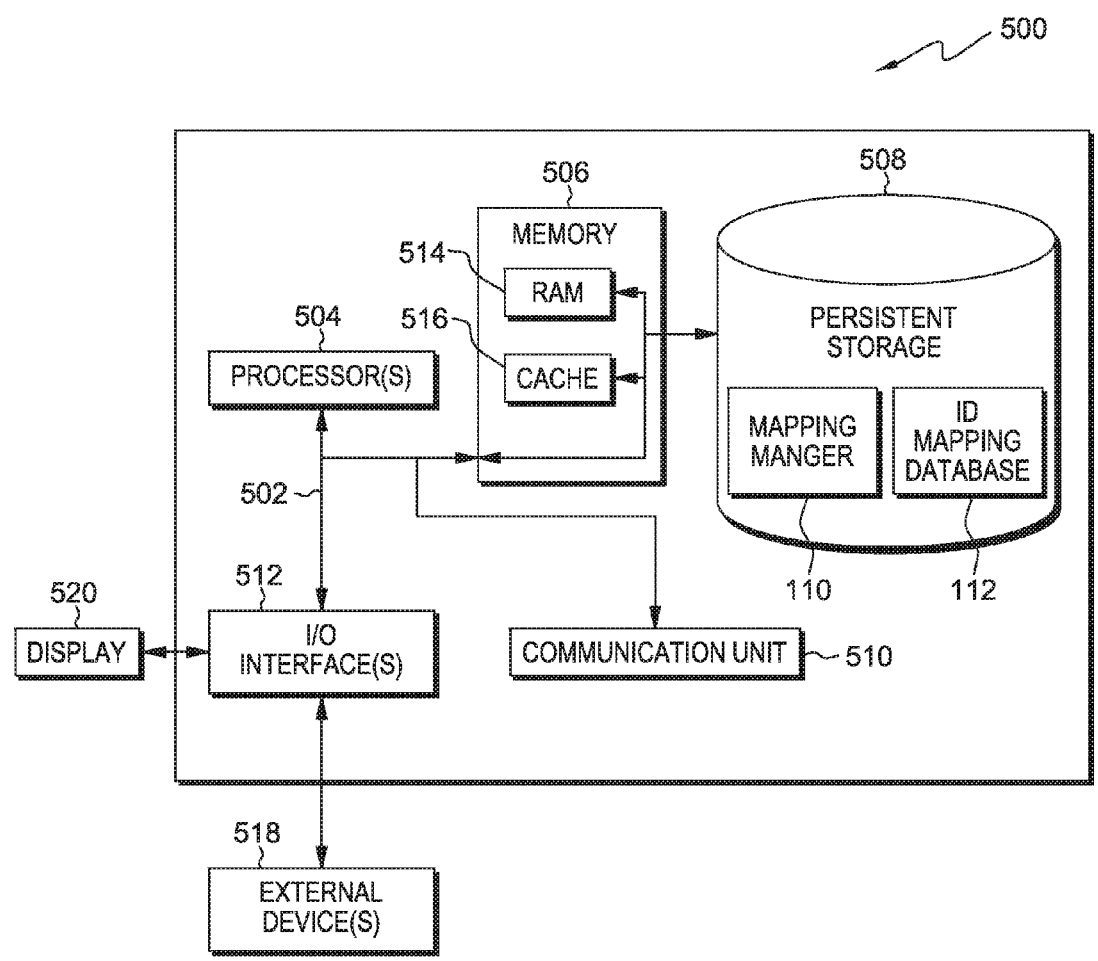
FIG. 5 is a block diagram of components of a computer system in an embodiment in accordance with the present invention.

FIG. 5 is a block diagram, generally depicted by the numeral 500, of components of a computer system in an embodiment in accordance with the present invention. It should be appreciated that FIG. 5 provides only an illustration of one implementation and does not imply any limitations with regard to the environments in which different embodiments may be implemented. Many modifications to the depicted environment may be made.

Computer system 500 is representative of NAS server 102 and NAS server 132. Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Mapping manager 110 and ID mapping database 112 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 116, Windows® system 118, UNIX-like system 124, and NAS server 132. In these examples, communications unit 510 includes one or more network interface cards. Communications unit 510 may provide communications through the use of either or both physical and wireless communications links. ID mapping database 112 may be downloaded to persistent storage 508 through communications unit 510.

I/O interface(s) 512 allows for input and output of data with other devices that may be connected to NAS server 102 or NAS server 132. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., ID mapping database 112, can be stored on such portable computer readable storage media and can be loaded onto persistent storage 508 via I/O interface(s) 512. I/O interface(s) 512 may also connect to a display 520.

Display 520 provides an optional mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for data mirroring for network attached storage, the method comprising:
receiving, by one or more processors at a second networked attached storage (NAS) server, a queue of updated data files from a first NAS server, wherein the received queue of updated data files contains elements updated at the first NAS server since a prior synchronization;

writing, by one or more processors at the second NAS server, the updated data files and updated metadata information from the first NAS server to the second NAS server; and translating, by one or more processors at the second NAS server, permission entries of the transmitted data files from the first NAS server using an identity mapping database file of the first NAS server and an identify mapping database file of the second NAS server, such that the permission entries reflect a local ID mapping database on the second NAS server, wherein the translating comprises:

accessing, by one or more processors at the second NAS server, both a local and a remote copy of the first NAS server's identity mapping database file;

determining, by one or more processors at the second NAS server, a user identity of a data file using the local and the remote copy of the first NAS server's identity mapping database file; and restoring, by one or more processors at the second NAS server, access control list and owner information and permissions of the data file to match an internal user identity of the second NAS server, using the identity mapping database file of the second NAS server.

2. The method of claim 1, wherein receiving, by one or more processors at a second networked attached storage (NAS) server, a queue of updated data files from a first NAS server comprises:

receiving, by one or more processors at the second NAS server, a copy of the identity mapping database file of the first NAS server from the first NAS server;

receiving, by one or more processors at the second NAS server, the updated data elements of data files from the first NAS server; and receiving, by one or more processors at the second NAS server, the updated metadata information of the data files from the first NAS server.

3. The method of claim 2, further comprising:

prior to receiving the copy of the identity mapping database file of the first NAS server, duplicating, by one or more processors at the second NAS server, the identity mapping database file of the first NAS server on the second NAS server;

wherein the received copy of the identity mapping database file of the first NAS server updates the previously duplicated copy of the identity mapping database file of the first NAS server on the second NAS server.

4. The method of claim 3, wherein the received copy of the identity mapping database of the first NAS server that updates the previously duplicated copy of the identity mapping database file of the first NAS server is written to a temporary location on the second NAS server.

5. The method of claim 1, wherein writing, by one or more processors at the second NAS server, the updated data files and the updated metadata information from the first NAS server comprises:

writing, by one or more processors at the second NAS server, the updated data elements of the data files from the first NAS server; and writing, by one or more processors at the second NAS server, the updated metadata information of the data files from the first NAS server.

6. A computer program product for data mirroring for network attached storage, the computer program product comprising:

one or more computer readable storage media and program instructions stored on the one or more computer readable storage media, the program instructions comprising:

program instructions to receive, at a second networked attached storage (NAS) server, a queue of updated data files from a first NAS server, wherein the received queue of updated data files contains elements updated at the first NAS server since a prior synchronization;

program instructions to write, at the second NAS server, the updated data files and updated metadata information from the first NAS server to the second NAS server; and program instructions to translate, at the second NAS server, permission entries of the transmitted data files from the first NAS server using an identity mapping database file of the first NAS server and an identify mapping database file of the second NAS server, such that the permission entries reflect a local ID mapping database on the second NAS server, wherein the program instructions to translate comprise:

program instructions to access, at the second NAS server, both a local and a remote copy of the first NAS server's identity mapping database file;

program instructions to determine, at the second NAS server, a user identity of a data file using the local and the remote copy of the first NAS server's identity mapping database file; and program instructions to restore, at the second NAS server, access control list and owner information and permissions of the data file to match an internal user identity of the second NAS server, using the identity mapping database file of the second NAS server.

7. The computer program product of claim 6, wherein program instructions to receive, at a second networked attached storage (NAS) server, a queue of updated data files from a first NAS server comprise:

program instructions to receive, at the second NAS server, a copy of the identity mapping database file of the first NAS server from the first NAS server;

program instructions to receive, at the second NAS server, the updated data elements of data files from the first NAS server; and program instructions to receive, at the second NAS server, the updated metadata information of the data files from the first NAS server.

8. The computer program product of claim 7, further comprising:

program instructions to, prior to receiving the copy of the identity mapping database file of the first NAS server, duplicate, at the second NAS server, the identity mapping database file of the first NAS server on the second NAS server;

wherein the received copy of the identity mapping database file of the first NAS server updates the previously duplicated copy of the identity mapping database file of the first NAS server on the second NAS server.

9. The computer program product of claim 8, wherein the received copy of the identity mapping database of the first NAS server that updates the previously duplicated copy of the identity mapping database file of the first NAS server is written to a temporary location on the second NAS server.

10. The computer program product of claim 6, wherein program instructions to write, at the second NAS server, the updated data files and the updated metadata information from the first NAS server comprise:

program instructions to write, at the second NAS server, the updated data elements of the data files from the first NAS server; and program instructions to write, at the second NAS server, the updated metadata information of the data files from the first NAS server.

11. A computer system for data mirroring for network attached storage, the computer system comprising:

one or more computer processors;

one or more computer readable storage media;

program instructions stored on the computer readable storage media for execution by at least one of the one or more processors, the program instructions comprising:

program instructions to receive, at a second networked attached storage (NAS) server, a queue of updated data files from a first NAS server, wherein the received queue of updated data files contains elements updated at the first NAS server since a prior synchronization;

program instructions to write, at the second NAS server, the updated data files and updated metadata information from the first NAS server to the second NAS server; and program instructions to translate, at the second NAS server, permission entries of the transmitted data files from the first NAS server using an identity mapping database file of the first NAS server and an identify mapping database file of the second NAS server, such that the permission entries reflect a local ID mapping database on the second NAS server, wherein the translating comprises:

program instructions to access, at the second NAS server, both a local and a remote copy of the first NAS server's identity mapping database file;

program instructions to determine, at the second NAS server, a user identity of a data file using the local and the remote copy of the first NAS server's identity mapping database file; and program instructions to restore, at the second NAS server, access control list and owner information and permissions of the data file to match an internal user identity of the second NAS server, using the identity mapping database file of the second NAS server.

12. The computer system of claim 11, wherein program instructions to receive, at a second networked attached storage (NAS) server, a queue of updated data files from a first NAS server comprise:

program instructions to receive, at the second NAS server, a copy of the identity mapping database file of the first NAS server from the first NAS server;

program instructions to receive, at the second NAS server, the updated data elements of data files from the first NAS server; and program instructions to receive, at the second NAS server, the updated metadata information of the data files from the first NAS server.

13. The computer system of claim 12, further comprising:

program instructions to, prior to receiving the copy of the identity mapping database file of the first NAS server, duplicate, at the second NAS server, the identity mapping database file of the first NAS server on the second NAS server;

wherein the received copy of the identity mapping database file of the first NAS server updates the previously duplicated copy of the identity mapping database file of the first NAS server on the second NAS server.

14. The computer system of claim 13, wherein the received copy of the identity mapping database of the first NAS server that updates the previously duplicated copy of the identity mapping database file of the first NAS server is written to a temporary location on the second NAS server.

15. The computer system of claim 11, wherein program instructions to write, at the second NAS server, the updated data files and the updated metadata information from the first NAS server comprise:

program instructions to write, at the second NAS server, the updated data elements of the data files from the first NAS server; and program instructions to write, at the second NAS server, the updated metadata information of the data files from the first NAS server.

* * * * *